(12) United States Patent
Duyvesteyn et al.

(10) Patent No.: US 6,387,239 B1
(45) Date of Patent: May 14, 2002

(54) RECOVERY OF METALS FROM ORE

(75) Inventors: Willem P. C. Duyvesteyn; Julia R. Budden; Manuel R. Lastra, all of Reno, NV (US)

(73) Assignee: BHP Minerals International, Inc., Houton, TX (US)

( * ) Notice: Subject to any disclaimer, the term of this patent is extended or adjusted under 35 U.S.C. 154(b) by 0 days.

(21) Appl. No.: 09/441,488

(22) Filed: Nov. 17, 1999

(51) Int. Cl.$^7$ ................................................. C22B 3/00
(52) U.S. Cl. ....................... 205/587; 205/589; 205/593; 205/594; 205/595; 205/604
(58) Field of Search ................. 205/587, 589, 205/593, 594, 595, 604

(56) References Cited

U.S. PATENT DOCUMENTS

| | | | |
|---|---|---|---|
| 4,740,243 A | 4/1988 | Krebs-Yuill et al. | |
| H1074 H | * 7/1992 | Lazaroff et al. | ............ 205/702 |
| 5,441,712 A | 8/1995 | Duyvesteyn et al. | |
| 5,571,308 A | 11/1996 | Dyvesteyn et al. | |
| 5,573,575 A | 11/1996 | Kohr | |
| 5,626,648 A | 5/1997 | Duyvesteyn et al. | |

FOREIGN PATENT DOCUMENTS

| | | |
|---|---|---|
| AU | 701811 | 10/1994 |
| CA | 2065491 | 10/1992 |
| DE | 25 57 008 A | 7/1977 |
| EP | 0 522 978 A | 1/1993 |
| FR | 2 725 457 A | 4/1996 |
| GB | 1 382 357 A | 1/1975 |
| WO | WO98/261000 | 6/1998 |

OTHER PUBLICATIONS

Database WPI Section Ch, Week 199528, Derwent Publications Ltd., London, GB; Class E32, AN 1995–212750, XP002170247 & JP 07 126013 A (Kaneko M), May 16, 1995 (1995–05–16) abstract.

Database WPI Section Ch, Week 199954, Derwent Publications Ltd., London, GB; Class D16, AN 1999–620925; XP002170261 & AU 18524 99 A (PLACER DOME INC), Sep. 16, 1999 (1999–09–16) abstract.

Database WPI Section Ch, Week 197822, Derwent Publications Ltd., London, GB; Class M25, AN 1978–38947A, XP002170263 & JP 53 042117 A (ISE KAGAKU KOGYO KK), Apr. 17, 1978 abstract.

* cited by examiner

*Primary Examiner*—Arun S. Phasge
(74) *Attorney, Agent, or Firm*—Brinks Hofer Gilson & Lione; G. Peter Nichols

(57) ABSTRACT

A bio-leaching method is provided for recovering metal from a metal containing ore. The ore is subjected to contact with a microorganism selective to the oxidation of sulfur. A sulfur containing compound is mixed with the microorganism before, during or after contact with the ore to systemically form sulfuric acid to leach the metal from the ore. The ore is in the form of a slurry, a heap, a charge in a vat and is bioleached for a time sufficient to dissolve the metal in the ore and form a metal-rich leachate and an ore residue. The metal can then be extracted from the metal-rich leachate. The metal containing ore may contain base metals, precious metals, or platinum group metals. Upon formation of the metal-rich leachate, the ore residue may be further processed to recover any precious metals or platinum group metals that may be present.

50 Claims, 2 Drawing Sheets

Effect of 2g S addition on saprolite leaching

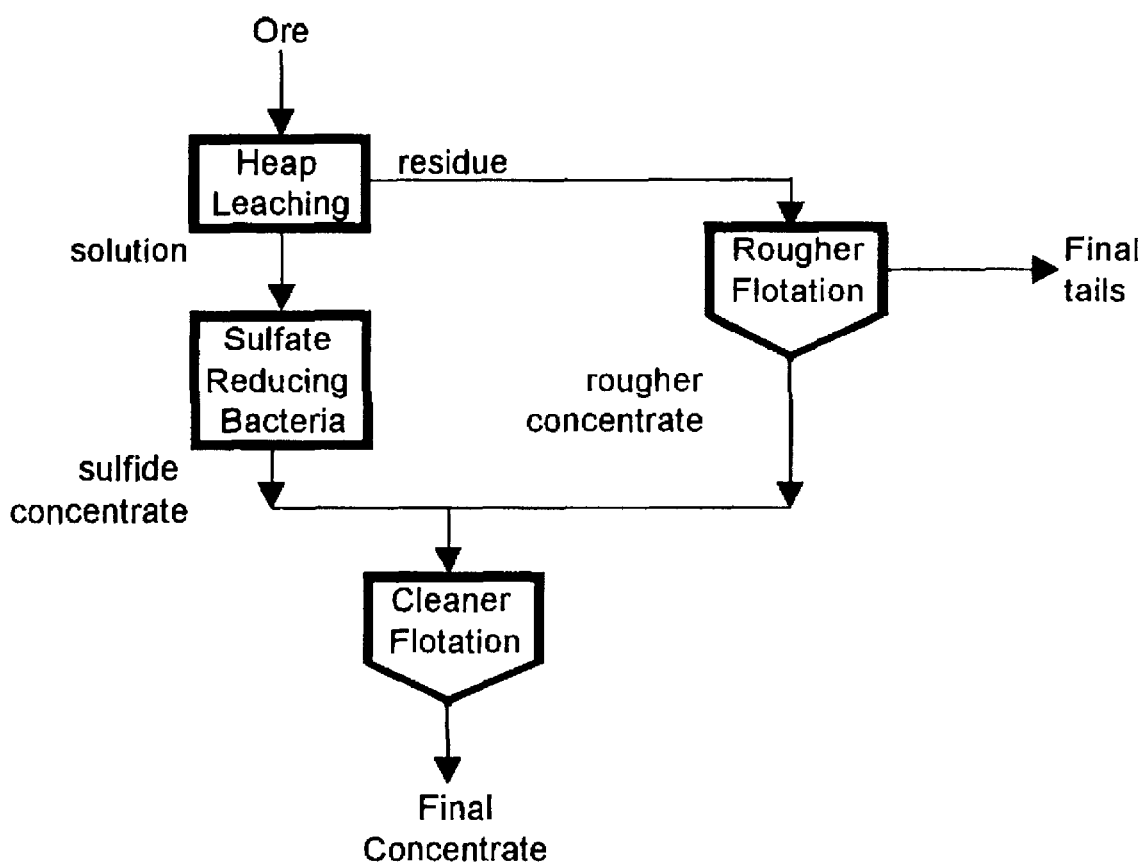

RECOVERY OF METALS FROM ORE

The present invention relates to a method of recovering metal from ore by bio-leaching. In a first aspect, the present invention relates to a method of recovering metals such as nickel, cobalt, zinc, and copper from ore by a novel bio-leaching method. In another aspect, the present invention also includes the recovery of precious and/or platinum group metals from ore that has been subjected to a bio-leaching process according to the first aspect of the invention.

BACKGROUND OF THE INVENTION

Valuable base metals such as nickel, cobalt, zinc, copper and the like are distributed throughout ores. In general, one or more of these base metals may be present in the ores, which can be in the oxide, sulfide, mixed, and other forms. In addition, it is often found that precious and/or platinum group metals are associated with the above base metals. It would therefore be desirable to recover not only the base metals but also the precious and/or platinum group metals using a simple, economical process.

There are many known processes to recover base metals. Many of them require high capital costs and are environmentally unfriendly. For example, one method of recovering these base metals is by hydrometallurigical processing using sulfuric acid to leach the metals from the ore. The problem with this type of process is that it requires the construction and operation of a sulfuric acid plant, which is expensive.

Another problem with recovering these types of metals is exemplified by the problems associated with the recovery of zinc from mixed ores (those ores in which the ore is in the oxide and sulfide form). Using sulfuric acid to recover zinc requires a very large amount of acid to effectively leach the zinc oxide. In addition, the leaching of zinc sulfide generally requires leaching under pressure.

An alternative method to the recovery of these metals is by a flotation process. It is known, however, that the flotation process is generally not effective when the ore is a mixed ore.

Another process is described in Canadian patent application No. 2,065,491. In this application, nickel in nickel-containing ores may be recovered by a bio-leaching process. The described bio-leach process can be carried out by heap leaching where the bio-leach solution trickles gravimetrically through the heap.

Another similar process is described in U.S. Pat. No. 5,626,648. This patent teaches a bioleaching method for recovering nickel from lateritic ore and nickel-containing sulfidic material. Where the ore is a nickel containing lateritic ore, this patent teaches the use of microorganisms that systemically produce an organic acid conducive to forming a complex with nickel. The preferred organic acids are stated to be oxalic, pyruvic, citric, tartaric, malonic, and other acids. Where the ore is a nickel-containing sulfidic material, this patent teaches the use of a biooxidizing bacterium that is selective to the leaching of the sulfidic ore.

While the above processes are satisfactory, one problem with them is that they are specific to the particular type of ore to be leached. The present invention addresses that problem by providing an economical and effective process for recovering base metals from mixed ores, as well as oxide and sulfide ores, without regard to the ore content. In addition, the above processes do not contemplate the further recovery of precious and/or platinum group metals.

SUMMARY OF THE INVENTION

The present invention provides a process for economically recovering base metals from ore. In general, the base metals are selected from the group consisting of nickel, cobalt, zinc, and copper. The present invention also provides a process for recovering precious and/or platinum group metals. The precious group metals are selected from the group consisting of silver and gold. The platinum group metals are selected from the group consisting of rhenium, osmium, iridium, platinum, technetium, ruthenium, rhodium, palladium, and mixtures thereof.

In general terms, the process includes the steps of contacting a metal-containing ore with an effective amount of at least one microorganism that is selective to metabolize sulfur (sulfur selective microorganism) to systemically produce sulfuric acid in amounts effective to leach base metals from the ore to form a base metal-rich leachate and an ore residue. A sulfur-containing compound is mixed with the microorganism before, during, or after the microorganism contacts the ore. The addition of the sulfur-containing compound allows the amount of systemically produced sulfuric acid to be adjusted depending on the particular type of ore to be leached.

The base metal-rich leachate is separated from the ore residue. The base metal-rich leachate may be further processed to recover the base metals. In addition, the ore residue may be subjected to a flotation process to concentrate the precious and/or platinum group metals. The concentrate can be upgraded in a known manner to produce high-grade precious and/or platinum group metal(s).

The metal containing ore may provide the base metal in an oxide form, a sulfide form, and/or a mixed form (i.e., a form where the ore contains both oxide and sulfide forms). In other words, the ore may contain one or more of nickel, cobalt, zinc, and copper with each present in the ore in substantially all oxide form, all sulfide form, or a mixture of both oxide and sulfide forms. The metal containing ore may also contain one or more precious and/or platinum group metals.

The sulfur-containing compound may be any compound suitable to provide a source of sulfur. Therefore, the sulfur-containing compound can include, but is not limited to elemental sulfur, iron sulfide, nickel sulfide, cobalt sulfide, zinc sulfide, and copper sulfide.

Microorganisms suitable to metabolize the sulfur include those that oxidize the sulfur to provide sulfuric acid. The oxidizing microorganism metabolizes (oxidizes) the sulfur present in the ore and/or sulfur-containing compound to systemically produce sulfuric acid that, in turn, will leach the metal from the metal-containing ore. The useful microorganisms are distinguished from those described in U.S. Pat. No. 5,626,648, which produce organic acids—not sulfuric acid. According to one feature of the present invention, the systemically produced sulfuric acid is the only sulfuric acid used for leaching the ore and no additional sulfuric acid is required or needed.

One aspect of the present invention includes a process for bio-leaching base metal-containing ore to recover the metal in a useable form. In one embodiment, the process of the invention involves the heap, vat, or agitation bio-leaching of metal-containing ore by contacting the base metal-containing ore with an effective amount of at least one microorganism that is selective to metabolize sulfur and mixing a sulfur-containing compound with the microorganism before, during, or after the microorganism contacts the ore to systemically produce sulfuric acid in amounts effective to leach the base metal from the ore.

In a preferred aspect of the present invention, the metal-containing ore is formed into a heap having a top and a bottom. The sulfur selective microorganism is placed into intimate contact with a substantial portion of the metal-containing ore. Preferably, a solution containing the sulfur selective microorganism is caused over a period of time to trickle gravimetrically from the top to the bottom through the interstices of the heap.

Desirably, a sulfur-containing compound is mixed with the sulfur selective microorganism before applying the solution to the heap, mixed with the microorganism during the application of the microorganism to the heap, or mixed with the ore prior to applying the microorganism to the heap. More preferably, the sulfur-containing compound is mixed with the sulfur selective microorganism and any other ingredients to form a solution. It is to be understood that the sulfur-containing compound can be added at any time during the process so long as at some point in time there is intimate contact with the sulfur selective microorganism so that the microorganism can oxidize the sulfur to systemically form sulfuric acid.

The ore residue remaining from the above-described leach process can then be further processed to provide precious and/or platinum group metals in a form suitable for commercial sale. For example, the ore residue may be separated from the heap and ground to a size suitable for flotation processing. The ground ore residue is then subjected to mineral flotation collectors to concentrate the precious and/or platinum group metals. The concentrate may then be upgraded to produce a suitably high grade of precious and/or platinum group metal(s) for sale or refining.

In one embodiment of the present invention, the process includes heap leaching according to the methods described above and separating the solution from the residue. The solution is treated with a microorganism to provide a sulfide concentrate simultaneously, the residue is treated in a rougher flotation process to provide a rougher concentrate and tails. The sulfide concentrate and rougher concentrate are combined in a cleaner flotation process to provide a final concentrate from which base and/or precious metals may be recovered.

A benefit of the present invention is that the size of the sulfuric acid plant can be greatly reduced. As a result, the capital and operating costs of the methods of the present invention are substantially less than if a sulfuric acid plant were needed.

As used in the specification and appended claims, the term microorganism includes both the singular and the plural. In addition, all percentages used in the specification and appended claims are by weight, unless specifically noted otherwise.

BRIEF DESCRIPTION OF THE DRAWING

FIG. 2 shows one embodiment of the process according to the present invention.

DETAILED DESCRIPTION OF THE INVENTION

Figure 1:
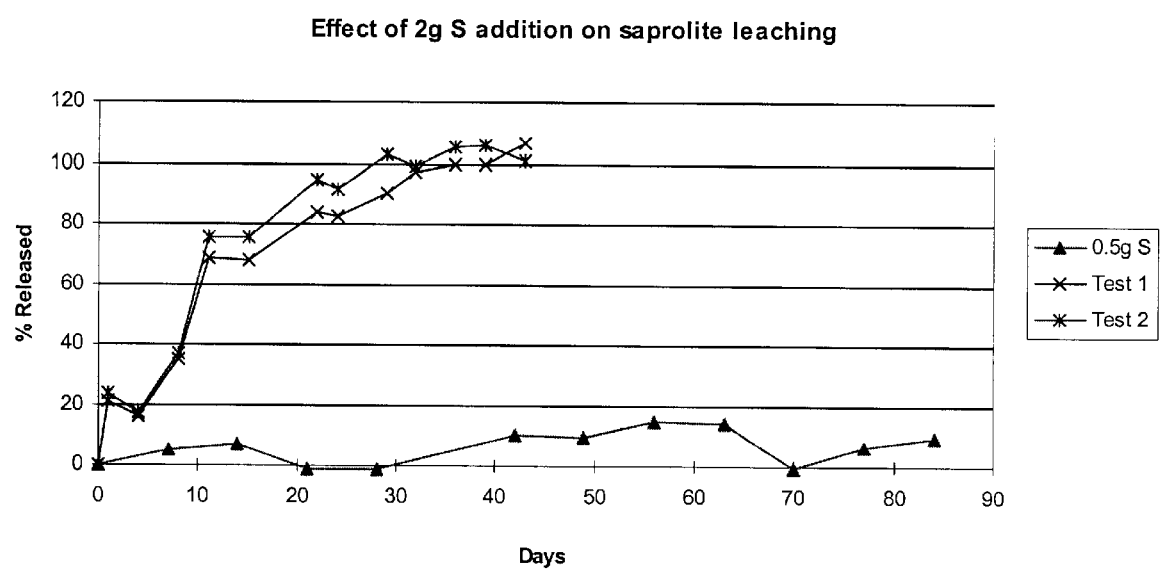
FIG. 1 shows the amount of nickel recovered from a saprolite ore with either 0.5 gram elemental sulfur or 2 gram elemental sulfur added to a mixture of ore and a microorganism selective to oxidize sulfur.

The present invention provides a process for economically recovering metal from metal-containing ores. In general terms, the process includes the steps of contacting the metal-containing ore with an effective amount of at least one microorganism that is selective to metabolize sulfur (sulfur selective microorganism) to systemically produce sulfuric acid in amounts effective to leach the base metals from the ore to form a base metal-rich leachate and an ore residue. Desirably, a sulfur-containing compound is mixed with the microorganism before, during, or after the microorganism contacts the ore.

The metal containing ore may provide the metal in an oxide form, a sulfide form, and/or a mixed form (i.e., a form where the ore contains both oxide and sulfide forms). In other words, the ore may contain one or more of nickel, cobalt, zinc, and copper with each present in the ore in substantially all oxide form, all sulfide form, or a mixture of both oxide and sulfide forms.

In addition, the metal containing ore (and the ore residue) may contain one or more metals selected from the group consisting of precious metals and platinum group metals. The precious group metals are selected from the group consisting of silver and gold. The platinum group metals are selected from the group consisting of rhenium, osmium, iridium, platinum, technetium, ruthenium, rhodium, palladium, and mixtures thereof.

Microorganisms suitable to metabolize the sulfur include those that oxidize the sulfur to provide sulfuric acid. The oxidizing microorganism metabolizes (oxidizes) the sulfur present in the ore and/or sulfur-containing compound to systemically produce sulfuric acid that, in turn, will leach the metal from the metal-containing ore. According to one feature of the present invention, the systemically produced sulfuric acid is the only sulfuric acid used for leaching the ore and no additional sulfuric acid is required or needed.

The sulfur-containing compound generally includes any compound containing a suitable quantity of sulfur. The sulfur-containing compound is selected from the group consisting of elemental sulfur, iron sulfide, nickel sulfide, cobalt sulfide, zinc sulfide, copper sulfide, and mixtures thereof. The amount of sulfur containing compound to be added necessarily depends on the amount and type of ore to be leached as well as the quantity of sulfur present in the sulfur-containing compound. In general, an effective amount of sulfur is that amount necessary to leach or dissolve at least about 75% by weight, preferably about 90% by weight and more preferably about 100% by weight of the initial metal present in the ore. One method of determining the effective amount of the sulfur containing compound to be added is to determine the acid requirement of the ore. The acid requirement can be determined by adding acid to the ore until the pH is maintained at the required level.

Likewise, an effective amount of the sulfur selective microorganism will, in general, be that amount sufficient to metabolize (oxidize) the necessary or effective amount of sulfur. Generally, a minimum amount of microorganism is about $1 \times 10^8$ active cells/ml.

Preferably, the sulfur selective microorganism is an oxidizing bacterium that is capable of oxidizing sulfur. Non-limiting examples of suitable bacteria include those selected from the group consisting of *Thiobacillus thiooxidans, Thiobacillus ferroxidans*, Leptospirillum species, Sulfobacillus, Thermosulfidooxidans, *Sulfolobus brierleyi, Sulfolobus acidocaldarius*, Sulfolobus BC, *Sulfolobus sulfataricus*, Thiomicrospora sp., Achromatium sp., Macromonas sp., Thiobacterium sp., Thiospora sp., and Thiovulum sp., and mixtures thereof.

The sulfur selective microorganism can be mixed with an aqueous solution or an aqueous nutrient solution. The nutrients include the conventional nutrients known to those of skill in the art.

In general, the bacterial activity will affect the oxidation rate and its activity is affected by pH, temperature, and degree of aeration. As noted above, the pH is desirably maintained at a level between about 1 and about 5, preferably about 1.5 to about 3 to provide an effective rate of nickel leaching from the ore. The pH may be controlled by the addition of sulfur containing compound, sulfur selective microorganisms or by varying the temperature or aeration to increase the activity of the sulfur selective microorganisms. In this regard, it may be desirable to provide a source of oxygen, for example from air, during the contacting.

The contacting may be by any suitable method to ensure sufficient contact of the microorganism with the sulfur-containing compound and the ore. For example, the contacting may use heap leaching, agitation leaching, vat leaching, and other similar methods. The contacting is carried out at a temperature of at least about ambient and for a time sufficient to dissolve (leach) substantial amounts of metal from the metal-containing ore to provide a metal-rich leachate or solution.

In addition, it is desirable to maintain the pH in a range between about 1 and about 5, preferably from about 1.5 and about 3, to provide an effective rate of leaching of the metal. Similarly, the process may include providing a source of oxygen during the contacting.

The metals can be recovered from the leachate and separated from each other by any suitable method. In one method, the metal-rich leachate is contacted with an ion exchange resin selective to the absorption of the metal(s) to remove the metal(s) from the metal-rich leachate. The ion exchange may be accomplished using any suitable method (fixed bed ion exchange, continuous counter current ion exchange, short bed reciprocating flow, carousel method or resin-in-pulp). A description of suitable methods are set forth in PCT publication WO 96/20291 and WO 97/04139, relevant portions of each are incorporated herein by reference.

The ion exchange process may include, but is not limited to, a single fixed bed of resin, two or more fixed beds in parallel or in series, or a plurality of resin columns that move countercurrently to the flow of the feed solution. For example, an ISEP continuous contactor manufactured by Advanced Separation Technologies, Inc. of Lakeland, Fla. or a Recoflo ion exchange system made by Eco-Tec of Pickering, Ontario, Canada may be used.

It is to be understood that any arrangement of ion exchange resin suitable to selectively absorb the metals in the leachate can be used. In one embodiment, the ion exchange resin is provided in two steps in series. The leachate is passed through two ion exchange steps such that the raffinate of the first stage, after neutralization, forms the feed of the second stage. By using two stages, the absorption of metals onto the resin is enhanced, resulting in substantially complete removal of metals from the leachate. It is understood that more than two steps could be used for complete metal removal from the leachate.

The metal loaded onto the resin and may thereafter be extracted from the ion exchange resin by contacting the resin with an acid to form a metal-containing eluant, from which the metal(s) can be separated and recovered in a known manner. The amount or volume of acid used to strip the metal is generally that sufficient to provide a concentration of metal that corresponds to about 10 gpl to about 25 gpl.

Alternatively, a resin-in-pulp method may be used. In the resin-in-pulp method, the ore is blended with a sulfur containing compound, the sulfur selective microorganism (preferably in solution), and the resin. The blended materials are maintained in suspension for a period of time and at an appropriate pH to allow the metal(s) to be leached from the ore and loaded onto the resin. The resin is then screened from the suspension and the metal(s) are recovered.

In another embodiment, the metal(s) may be extracted from the leachate by adding an effective amount of a microorganism selective to metabolize sulfate (sulfate selective microorganism). Suitable sulfate selective microorganisms include but are not limited to Desulfovibro sp., Desulfotomaculum sp., Desulfomonas sp. and mixtures thereof. The sulfate selective microorganism will metabolize (reduce) the sulfate present in the leachate to systemically produce $H_2S$ gas, which will react with the metal ions present in the leachate to precipitate them as metal sulfides. Thereafter, the precipitated metal sulfides can be separated from the leachate and the metal can be recovered in a suitable manner such as by smelting. One advantage to this portion of the process is that the capital cost of treatments systems, ion exchange and the ancillary equipment is dispensed with.

In another embodiment, the leachate may be subjected to liquid extraction to separate one metal from another, for example, to separate cobalt from nickel. For example, in this aspect, if the metal containing ore contains nickel, cobalt, and other metals, the nickel and cobalt, can be selectively removed from the leachate by first contacting the leachate with a selective ion exchange resin to selectively separate the nickel and cobalt from the other metals. The nickel and cobalt can be eluted from the resin and separated from each other by liquid extraction.

Alternatively, where the leachate contains zinc, the zinc may be recovered in a form suitable for commercial sale (either as zinc oxide or as zinc metal cathodes). For example, the zinc leachate may be subjected to solvent extraction using an organic extractant to form an organic phase that contains the zinc and a raffinate. In general, the extractant is an ester of phosphoric acid. In particular, the extractant is selected from the group consisting of di-2-ethylhexylphosphoric acid (D2EHPA) and di-2ethylhexylthiophosphoric acid (D2EHTPA).

The organic phase and the raffinate are separated and the zinc-loaded organic solution phase is stripped with a strip solution so that the zinc can be recovered. In one embodiment, the zinc-loaded organic solution is stripped with a sulfuric acid strip solution to form a zinc sulfate solution, which can be further processed by electrowinning to recover the zinc as zinc cathodes. The zinc depleted electrolyte can then be recycled and used as all or a portion of the strip solution.

Alternatively, the zinc-loaded organic solution is stripped with a nitric acid solution to form a zinc solution, which can be further processed to recover the zinc as zinc oxide. For example, the zinc nitrate can be subjected to high temperature treatment to oxidize the zinc nitrate to form zinc oxide and nitric acid. The nitric acid may be recovered, recycled, and used as all or a portion of the strip solution.

After the metal(s) have been extracted from the leachate, the metal(s) may be recovered in substantially pure form by electrolysis, electrowinning, or other known and suitable methods.

According to one aspect of the present invention, after leaching to form a metal-rich leachate, an ore residue remains. The ore residue is separated from the leachate and may be further processed to recover one or more metals selected from the group of precious metals and platinum group metals in a form suitable for commercial sale. For example, the ore residue may be separated from the heap and ground to a size suitable for flotation processing. The ground ore residue is then subjected to mineral flotation collectors to concentrate the precious and/or platinum group metals. The concentrate may then be upgraded to produce a suitably high grade of precious and/or platinum group metal(s) for sale or refining.

One aspect of the present invention includes a process for bio-leaching metal-containing ore. According to this aspect, the process includes the steps of contacting the metal-containing ore with an effective amount of a microorganism that selectively oxidizes sulfur and mixing an effective amount of a sulfur-containing compound with the microorganism before, during, or after contact with the ore. The mixing of the sulfur-containing compound with the microorganism systemically produces sulfuric acid, which will leach the metal(s) from the metal-containing ore. According to one feature of the present invention, the systemically produced sulfuric acid is the sole source of sulfuric acid for leaching the ore. According to another feature of the present invention, the systemically produced sulfuric acid is the sole acid used to leach the ore.

The contacting may be by any suitable method to ensure sufficient contact of the microorganism with the sulfur and consequent contact of the produced acid with the ore. For example, the contacting may use heap leaching, agitation leaching, vat leaching, and other similar methods. In vat leaching, the ore is placed in a large vat and saturated with a solution containing the sulfur selective microorganisms. A sulfur containing compound is added before, during, or after adding the microorganism solutions. The contents of the vat are thoroughly mixed for a period of time to effect dissolution of the metals.

In another preferred aspect of the present invention, the metal containing ore is formed into a heap and a solution containing a microorganism selective to the oxidation of sulfur is caused over a period of time to trickle gravimetrically through the interstices of the heap. The effluent may, if desired, be recycled to the heap. As with the above aspect, a sulfur containing compound may be mixed with the sulfur selective microorganism solution prior to applying the solution to the heap, mixed with the sulfur selective microorganism solution during the application of the solution to the heap, or mixed with the ore prior to applying the solution to the heap. It is to be understood that the sulfur containing compound can be added at any time during the process so long as there is intimate contact with the sulfur selective microorganism so that the microorganism can oxidize the sulfur to systemically produce sulfuric acid.

The microorganism (solution or otherwise) can be collected at the bottom and recycled to the top. In addition, fresh microorganism (solution or otherwise) can be continuously or intermittently applied to the top of the heap. The remaining ore in the heap may be further processed as described above to recover one or more precious metals or platinum group metals that may be present.

In one preferred embodiment, the metal containing ore is agglomerated to a particle size greater than about 6 mesh and less than about 1 inch and formed into a self-sustaining heap. A solution containing a microorganism selective to oxidation sulfur is applied to the top of the heap and allowed to percolate through the interstices of the ore to the bottom. A sulfur containing compound is preferably added to the microorganism solution before applying the solution to the heap.

In another embodiment, a sulfur containing compound is mixed with the sulfur selective microorganism to form a solution that is applied to a metal containing ore to agglomerate the ore into agglomerates having an average size greater than about 6 mesh and less than about 1 inch. The agglomerated ore is formed into a self-sustaining heap upon which water or a nutrient solution (an aqueous solution) is applied and allowed to percolate through the interstices of the ore from the top of the heap to the bottom.

In preparing the ore for leaching, the ore as mined can be crushed using a jaw crusher with the jaws set at a gap of about 1 inch to about ¾ inch. To prepare the pelletized ore, a rotary pelletizer can be used.

The water or nutrient assists in the oxidation of the sulfur by the sulfur selective microorganism to systemically form sulfuric acid that will dissolve the metal(s) to form a metal-rich leachate emanating from the bottom of the heap. The metal(s) in the metal-rich leachate can then be extracted, separated, and recovered. If desired, the leachate may be neutralized before extracting the metal(s).

In another aspect of the present invention, an ore containing precious and/or platinum group metals as well as base metals can be processed in the following manner. The ore may be separated into a majority fraction (containing about 60% to about 80% of the total ore) and a minority fraction. The majority fraction is subjected to a crushing, grinding, and flotation process described below; while the minority fraction is subjected to crushing to produce a sized ore suitable for heap leaching as described above.

The majority fraction is subjected to flotation processing to produce a low grade base and a concentrate containing the precious and/or platinum group metals. The concentrate is then mixed with the minority fraction to form a heap leach material, which is leached according to the processes described above to produce a metal-rich leachate. The metal-rich leachate is separate d from the residue, which contains the precious and/or platinum group metals. The residue can then be ground and subjected to flotation processing to form a precious and platinum group concentrate, which can then be upgraded for sale.

Referring to FIG. 2, an alternative embodiment to the present invention is shown. In this embodiment, the process includes heap leaching according to the methods described above and separating the solution from the residue. The solution is treated with a microorganism to provide a sulfide concentrate simultaneously, the residue is treated in a rougher flotation process to provide a rougher concentrate and tails. The sulfide concentrate and rougher concentrate are combined in a cleaner flotation process to provide a final concentrate from which base and/or precious metals may be recovered.

The following examples illustrate, but do not limit, the present invention. Unless otherwise indicated, all parts and percentages are by weight.

EXAMPLE 1

The following tests were conducted to determine the efficacy of the present invention. Five grams of saprolite ore, elemental sulfur and 90 milliliters of MKM were added to a 250-milliliter flask with 10 milliliter of inoculum that had been grown on elemental sulfur. The flask was placed in an orbital shaker and the temperature of the contents was maintained at 35° C. Samples were removed and analyzed for the presence of nickel. The sample volume removed was replaced with MKM to maintain a constant volume in the flask.

In one example, 0.5 gram of elemental sulfur was used. In another example, 2 gram of elemental sulfur was used. To confirm the results of the use of 2 gram of elemental sulfur, another test was conducted.

The results are shown in FIG. 1. It is seen that the addition of 0.5 gram of elemental sulfur did not result in an appreciable amount of nickel being leached from the ore. In contrast, the addition of 2 gram of sulfur resulted in the dissolution of about 75% of the initial nickel content after about 15 days and the dissolution of about 100% of the initial nickel content after about 30 days.

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed is:

1. A method for recovering metal from a metal-containing ore comprising:
    a. contacting the ore with a microorganism selective to oxidize sulfur for a time sufficient to leach the metal in the ore to form a metal-rich leachate and a residue;
    b. admixing elemental sulfur with the microorganism at a time prior to, during, or after the microorganism contacts the ore; and,
    c. separating the metal-rich leachate from the residue.

2. The method of claim 1 wherein the metal containing ore contains one or more metals selected from the group consisting of nickel, cobalt, copper, and zinc.

3. The method of claim 2 wherein the metal containing ore further contains one or more metals selected from the group consisting of precious metals and platinum group metals.

4. The method of claim 2 wherein the metal-rich leachate contains zinc.

5. The method of claim 4 further comprising:
    a. contacting the leachate with a solvent containing an organic extractant to form a zinc-containing organic phase and a raffinate;
    b. stripping the zinc-containing organic phase with a strip solution containing an acid selected from the group consisting of nitric acid and sulfuric acid.

6. The method of claim 5 wherein the zinc-containing organic phase is stripped with a solution containing nitric acid to form zinc nitrate which is subjected to high temperature treatment to form zinc oxide.

7. The method of claim 6 wherein after the high temperature treatment, nitric acid is recovered.

8. The method of claim 7 wherein the recovered nitric acid forms at least a portion of the strip solution.

9. The method of claim 5 wherein the zinc-containing organic phase is stripped with sulfuric acid to form zinc sulfate which is subjected to electrowinning to recover zinc cathode.

10. The method of claim 9 wherein during electrowinning a zinc depleted sulfate electrolyte is formed.

11. The method of claim 10 wherein the zinc depleted sulfate electrolyte forms at least a portion of the strip solution.

12. The method of claim 1 wherein the microorganism is a bacteria selected from the group consisting of *Thiobacillus thiooxidans*, *Thiobacillus ferroxidans*, Leptospirillum species, Sulfobacillus, Thermosulfidooxidans, *Sulfolobus brierleyi*, *Sulfolobus acidocaldarius*, Sulfolobus BC, *Sulfolobus sulfataricus*, Thiomicrospora sp., Achromatium sp., Macromonas sp., Thiobacterium sp., Thiospora sp., and Thiovulum sp., and mixtures thereof.

13. The method of claim 1 wherein the metal rich leachate includes a metal selected from the group consisting of nickel, cobalt, copper, and zinc.

14. The method of claims 13 wherein the residue contains one or more metals selected from the group consisting of precious metals and platinum group metals.

15. The method of claim 14 wherein the precious metals or platinum group metals are recovered.

16. The method of claim 13 further comprising contacting the metal-rich leachate with an ion exchange resin to form a metal-loaded resin.

17. The method of claim 16 further comprising eluting the absorbed metal from the metal-loaded resin by contacting the resin with a mineral acid solution.

18. The method of claim 1 wherein the metal-rich leachate is contacted with a microorganism selective to reduce sulfate for a period of time to form metal sulfides.

19. The method of claim 18 wherein the microorganism selective to reduce sulfate is selected from the group consisting of Desulfovibro sp., Desulfotomaculum sp., Desulfomonas sp. and mixtures thereof.

20. The method of claim 19 wherein the metal sulfides are recovered.

21. The method of claim 1 wherein the ore is formed into a heap before being contacted with the microorganism.

22. The method of claim 21 wherein contacting is achieved by passing a solution containing the microorganism through the heap.

23. A method for bio-leaching metal-containing oxide ore comprising:
    a. admixing a sulfur containing compound with a microorganism selective to oxidize sulfur to form a mixture;
    b. agglomerating a metal-containing oxide ore with the mixture to form agglomerates having an average size greater than about 6 mesh and less than about 1 inch;
    c. forming the agglomerates into a heap having a top and a bottom; and,
    d. applying an aqueous solution to the top of the heap, wherein sulfuric acid is systemically formed to leach at least a portion of the oxide ore.

24. The method of claim 23 wherein a metal-rich leachate is collected at the bottom of the heap.

25. The method of claim 24 wherein the microorganism is a bacteria selected from the group consisting of *Thiobacillus thiooxidans*, *Thiobacillus ferroxidans*, Leptospirillum species, Sulfobacillus, Thermosulfidooxidans, *Sulfolobus brierleyi*, *Sulfolobus acidocaldarius*, Sulfolobus BC, *Sulfolobus sulfataricus*, Thiomicrospora sp., Achromatium sp., Macromonas sp., Thiobacterium sp., Thiospora sp., and Thiovulum sp., and mixtures thereof.

26. The method of claim 25 further comprising contacting the metal-rich leachate with an ion exchange resin to form a metal-loaded resin.

27. The method of claim 26 further comprising eluting the absorbed metal from the metal-loaded resin by contacting the resin with a mineral acid solution and recovering the metal.

28. The method of claim 24 wherein the heap contains one or more metals selected from the group consisting of precious metals and platinum group metals.

29. The method of claim 28 wherein the one or more precious metals and platinum group metals are recovered.

30. A method for leaching metal from a metal-containing oxide ore that comprises:
    a. admixing water and a sulfur containing compound with a microorganism selective to oxidize sulfur to form an aqueous leach solution, and b. contacting the oxide ore with the leach solution for a time sufficient to effect leaching of at least a portion of the oxide ore to form a metal-rich leachate and a residue.

31. A method for recovering a metal selected from the group consisting of precious group metals and platinum group metals from an ore or concentrate containing one or more metals selected from the group consisting of nickel, cobalt, copper, and zinc, the method comprising:
   a. admixing a sulfur containing compound to the ore or concentrate;
   b. forming a heap;
   c. contacting the heap with a microorganism selective to oxidize sulfur for a time sufficient to leach the metal in the ore to form a metal-rich leachate and a residue;
   d. separating the leachate from the residue;
   e. grinding the residue to a size suitable for flotation processing;
   f. floating the ground residue to form a concentrate rich in one or more metals selected from the group consisting of precious group metals and platinum group metals;
   g. upgrading the concentrate to form a high grade product suitable for final refining.

32. A method for recovering a metal selected from the group consisting of precious group metals and platinum group metals from an ore or concentrate containing one or more metals selected from the group consisting of nickel, cobalt, copper, and zinc, the method comprising:
   a. separating the ore into a majority fraction and a minority fraction;
   b. floating the majority fraction to form a low grade base and a concentrate rich in one or more metals selected from the group consisting of precious group metals and platinum group metals;
   c. mixing the concentrate with the minority fraction to produce a mixture;
   d. forming the mixture into a heap;
   e. contacting the heap with a microorganism selective to oxidize sulfur for a time sufficient to leach metals to form a residue and a metal-rich leachate containing one or metals selected from the group consisting of nickel, cobalt, copper, and zinc;
   f. admixing a sulfur containing compound with the microorganism at a time prior to, during, or after the microorganism contacts the ore;
   g. separating the metal-rich leachate from the residue;
   h. subjecting the residue to flotation to form a concentrate rich in one or more metals selected from the group consisting of precious group metals and platinum group metals;
   i. upgrading the concentrate to form a high grade product suitable for final refining.

33. A method for recovering metal from a metal-containing oxide ore comprising:
   a. providing a metal-containing oxide ore, wherein the metal-containing oxide ore contains one or more metals selected from the group consisting of nickel, cobalt, copper, and zinc;
   b. contacting the metal-containing oxide ore with a microorganism selective to oxidize sulfur for a time sufficient to leach the metal in the ore to form a metal-rich leachate and a residue;
   c. admixing an amount of a sulfur containing compound with the microorganism at a time prior to, during, or after the microorganism contacts the oxide ore to leach at least a portion of the oxide portion of the ore; and
   d. separating the metal-rich leachate from the residue.

34. The method of claim 33 wherein the sulfur containing compound is selected from the group consisting of elemental sulfur, sulfide compounds and mixtures thereof.

35. The method of claim 33, wherein the microorganism is a bacteria selected from the group consisting of *Thiobacillus thiooxidans, Thiobacillus ferroxidans*, Leptospirillum species, Sulfobacillus, Thermosulfidooxidans, *Sulfolobus brierleyi, Sulfolobus acidocaldarius*, Sulfolobus BC, *Sulfolobus sulfataricus*, Thiomicrospora sp., Achromatium sp., Macromonas sp., Thiobacterium sp., Thiospora sp., and Thiovulum sp., and mixtures thereof.

36. The method of claim 33, further comprising contacting the metal-rich leachate with an ion exchange resin to form a metal-loaded resin.

37. The method of claim 33, wherein the ore is formed into a heap before being contacted with the microorganism.

38. A method for recovering metal from a metal-containing ore comprising:
   a. contacting the ore with a microorganism selective to oxidize sulfur for a time sufficient to leach the metal in the ore to form a metal-rich leachate and a residue;
   b. admixing a sulfur containing compound with the microorganism at a time prior to, during, or after the microorganism contacts the ore; and
   c. separating the metal-rich leachate from the residue, wherein the metal-containing ore contains one or more metals selected from the group consisting of nickel, cobalt, copper, and zinc, and further contains one or more metals selected from the group consisting of precious metals and platinum group metals.

39. A method for recovering metal from a metal-containing ore comprising:
   a. contacting the ore with a microorganism selective to oxidize sulfur for a time sufficient to leach the metal in the ore to form a metal-rich leachate and a residue;
   b. admixing a sulfur containing compound with the microorganism at a time prior to, during, or after the microorganism contacts the ore; and
   c. separating the metal-rich leachate from the residue, wherein the metal rich leachate contains one or more metals selected from the group consisting of nickel, cobalt, copper, and zinc, and wherein the residue contains one or more metals selected from the group consisting of precious metals and platinum group metals.

40. A method for recovering metal from a metal-containing ore comprising:
   a. contacting the ore with a microorganism selective to oxidize sulfur for a time sufficient to leach the metal in the ore to form a metal-rich leachate and a residue;
   b. admixing a sulfur containing compound with the microorganism at a time prior to, during, or after the microorganism contacts the ore; and
   c. separating the metal-rich leachate from the residue, wherein the metal-rich leachate is contacted with a microorganism selective to reduce sulfate for a period of time to form metal sulfides.

41. The method of claim 40 wherein the microorganism selective to reduce sulfate is selected from the group consisting of Desulfovibro sp., Desulfotomaculum sp., Desulfomonas sp. and mixtures thereof.

42. A method for recovering metal from a metal-containing or e comprising:

a. contacting the ore with a microorganism s elective to oxidize sulfur for a time sufficient to leach the metal in the ore to form a metal-rich leachate and a residue;
b. admixing a sulfur containing compound with the microorganism at a time prior to, during, or after the microorganism contacts the ore; and
c. separating the metal-rich leachate from the residue, wherein the metal-containing ore contains one or more metals select ed from the group consisting of nickel, cobalt, copper, and zinc, and wherein the metal-rich leachate contains zinc.

43. The method of claim 42 further comprising:
a. contacting the leachate with a solvent containing an organic extractant to form a zinc-containing organic phase and a raffinate; and
b. stripping the zinc-containing organic phase with a strip solution containing an acid selected from the group consisting of nitric acid and sulfuric acid.

44. The method of claim 43 wherein the zinc-containing organic phase is stripped with a solution containing nitric acid to form zinc nitrate which is subjected to high temperature treatment to form zinc oxide.

45. The method of claim 44 wherein after the high temperature treatment, nitric acid is recovered.

46. The method of claim 45 wherein the recovered nitric acid forms at least a portion of the strip solution.

47. The method of claim 43 wherein the zinc-containing organic phase is stripped with sulfuric acid to form zinc sulfate which is subjected to electrowinning to recover zinc cathode.

48. The method of claim 47 wherein during electrowinning a zinc depleted sulfate electrolyte is formed.

49. The method of claim 48 wherein the zinc depleted sulfate electrolyte forms at least a portion of the strip solution.

50. A method for bio-leaching metal-containing ore comprising:
a. admixing a sulfur containing compound with a microorganism selective to oxidize sulfur to form a mixture;
b. agglomerating a metal-containing ore with the mixture to form agglomerates having an average size greater than about 6 mesh and less than about 1 inch; and,
c. forming the agglomerates into a heap having a top and a bottom; and
applying an aqueous solution to the top of the heap, wherein sulfuric acid is systemically formed, wherein a metal-rich leachate is collected at the bottom of the heap, and wherein the heap contains one or more metals selected from the group consisting of precious metals and platinum group metals.

* * * * *